US010683616B2

United States Patent
Håkansson et al.

(10) Patent No.: US 10,683,616 B2
(45) Date of Patent: Jun. 16, 2020

(54) METHOD FOR FORMING A COMPOSITE COMPRISING MFC AND A COMPOSITE PRODUCED BY THE METHOD

(71) Applicant: Stora Enso OYJ, Helsinki (FI)

(72) Inventors: Philip Håkansson, Sölvesborg (SE); Isto Heiskanen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 114 days.

(21) Appl. No.: 16/067,985

(22) PCT Filed: Jan. 5, 2017

(86) PCT No.: PCT/IB2017/050033
§ 371 (c)(1),
(2) Date: Jul. 3, 2018

(87) PCT Pub. No.: WO2017/118929
PCT Pub. Date: Jul. 13, 2017

(65) Prior Publication Data
US 2019/0024320 A1  Jan. 24, 2019

Related U.S. Application Data

(60) Provisional application No. 62/274,893, filed on Jan. 5, 2016.

(51) Int. Cl.
*D21H 23/04* (2006.01)
*D21H 17/67* (2006.01)
(Continued)

(52) U.S. Cl.
CPC ........... *D21H 23/04* (2013.01); *C01F 11/181* (2013.01); *D21H 11/18* (2013.01); *D21H 17/25* (2013.01);
(Continued)

(58) Field of Classification Search
USPC .......... 162/181.1, 181.2; 106/162.1, 106/162.9–164.01, 400, 401, 447,
(Continued)

(56) References Cited

U.S. PATENT DOCUMENTS 5,679,220 A * 10/1997 Matthew ............... D21H 17/70
162/158
5,731,080 A * 3/1998 Cousin ................... D21H 11/18
106/464

(Continued)

FOREIGN PATENT DOCUMENTS

| CN | 104903512 A | 9/2015 |
| CN | 104903514 A | 9/2015 |

(Continued)

OTHER PUBLICATIONS

International Searching Authority, International Search Report, PCT/IB2017/050033, dated Mar. 10, 2017.

(Continued)

*Primary Examiner* — Dennis R Cordray
(74) *Attorney, Agent, or Firm* — Greer, Burns & Crain Ltd.

(57) ABSTRACT

The invention provides a method for the production of a composite comprising microfibrillated cellulose (MFC) and precipitated calcium carbonate. The method is characterized in that MFC is added to a suspension of calcium hydroxide during carbonation, whereby calcium carbonate is precipitated onto fibers or fibrils of the MFC in a controlled manner. By adding microfibrillated cellulose to the calcium suspension during the carbonation, the brightness and the strength of the MFC/PCC-composite is enhanced. Moreover, the inventive method facilitates the distribution of calcium dioxide and MFC in the suspension and thus gives rise to a more homogenous product.

12 Claims, 2 Drawing Sheets

(51) Int. Cl.

| | |
|---|---|
| *D21H 27/18* | (2006.01) |
| *C01F 11/18* | (2006.01) |
| *D21H 23/14* | (2006.01) |
| *D21H 11/18* | (2006.01) |
| *D21H 17/25* | (2006.01) |
| *D21H 17/69* | (2006.01) |
| *D21H 21/18* | (2006.01) |

(52) U.S. Cl.
CPC ........... *D21H 17/675* (2013.01); *D21H 17/69* (2013.01); *D21H 23/14* (2013.01); *D21H 27/18* (2013.01); *D21H 21/18* (2013.01)

(58) Field of Classification Search
USPC .................................................. 106/463–465
See application file for complete search history.

(56) References Cited

U.S. PATENT DOCUMENTS

| | | | |
|---|---|---|---|
| 5,824,364 | A | 10/1998 | Cousin et al. |
| 6,156,118 | A | 12/2000 | Silenius et al. |
| 6,251,222 | B1 | 6/2001 | Silenius et al. |
| 2004/0173329 | A1* | 9/2004 | Silenius ............... D21H 17/69 162/135 |
| 2006/0118259 | A1* | 6/2006 | Heikkinen ............... D21G 1/00 162/198 |
| 2009/0107645 | A1* | 4/2009 | Legnerfalt ............ D21H 17/67 162/176 |
| 2015/0299959 | A1 | 10/2015 | Axrup et al. |

FOREIGN PATENT DOCUMENTS

| | | |
|---|---|---|
| CN | 105121741 A | 12/2015 |
| EP | 2236545 | 10/2010 |
| EP | 2287398 A1 | 2/2011 |
| EP | 2486188 | 8/2012 |
| WO | 2010/112519 | 10/2010 |
| WO | 2014/072913 | 5/2014 |
| WO | 2015/101499 | 7/2015 |

OTHER PUBLICATIONS

International Searching Authority, Written Opinion of the International Searching Authority, PCT/IB2017/050033, dated Jul. 13, 2016.
Chinga-Carrasco, G., "Cellulose Fibres, Nanofibrils and Microfibrils: The Morphological Sequence of MFC Components From a Plant Physiology and Fibre Technology Point of View," Nanoscale Research Letters 2011, 6:417.
Fengel, D., "Ultrasound Behaviour of Cell Wall Polysaccharides," TAPPI, vol. 53, No. 3, (1970), pp. 497-503. (Abstract).

* cited by examiner

METHOD FOR FORMING A COMPOSITE COMPRISING MFC AND A COMPOSITE PRODUCED BY THE METHOD

This application is a U.S. National Phase under 35 U.S.C. § 371 of International Application No. PCT/IB2017/050033, filed Jan. 5, 2017, which claims priority under 35 U.S.C. §§ 119 and 365 to U.S. Provisional Application No. 62/274,893, filed Jan. 5, 2016.

TECHNICAL FIELD

The present document relates to a method for producing a composite comprising microfibrillated cellulose (MFC) and a composite produced by the method. More particularly, the present disclosure relates to a method for producing a composite comprising microfibrillated cellulose and precipitated calcium carbonate and the use thereof.

BACKGROUND

In recent years, the use of Microfibrillated cellulose (MFC) has been explored in many fields. In the papermaking industry, it has been shown that the addition of MFC can increase the strength of a paper or paper board. When used in paper coating applications, it may replace synthetic or natural binders. MFC can be further used in many other technical fields, such as the food industry, polymer or plastic industry, paint, ceramic ink, rubber industry, cosmetic and pharmaceutical industry.

A dispersion comprising fibrillated cellulose, such as MFC, has the appearance of a highly viscous, shear-thinning transparent gel at low dry contents. The gel has high viscosity making it very difficult to make it flow at low shear rates. This makes it difficult to distribute it in dispersions or suspension as well as other processing through pipes and pumps.

Microfibrillated cellulose (MFC) often form the basis of, or part of composites suitable for applications such as fillers or strength additives in paper or paper boards, in paints, foods and pharmaceuticals. These composites are often formed by mixing or slurrying a pigment or inorganic particle, such as precipitated calcium carbonate (PCC) with MFC.

PCC can be produced by treating a lime suspension (calcium hydroxide) with carbon dioxide ($CO_2$). The chemical reaction in which calcium hydroxide reacts with carbon dioxide and forms calcium carbonate is oftentimes referred to as carbonation, or carbonatation.

PCC/MFC composite materials are useful in various industrial processes, such as papermaking, to e.g. increase the filler content without deteriorate the properties and to improve the retention of each individual component. U.S. Pat. No. 6,156,118 discloses a process wherein nanofibers are added to PCC forming a PCC/MFC composite material.

More recently, precipitation of PCC on nanofibers by mixing MFC with lime milk followed addition of carbon dioxide has been described. This, and the use thereof in papermaking, has been disclosed in e.g. U.S. Pat. Nos. 6,251,222 and 5,824,364. WO2014072913 discloses a process for production of a dry composite material, which is obtained by mixing MFC with lime milk and subsequently adding carbon dioxide to induce calcium carbonate to precipitate on the MFC fibrils. EP2486188 further describes a process wherein milk of lime and nanocellulose were pre-mixed whereupon carbon dioxide was injected.

However, when adding MFC to milk of lime prior to the carbonation, PCC tend to substantially completely cover the MFC fibrils, whereby the strength enhancing properties of the MFC is deteriorated. Moreover, the opacity of the thus formed composite has not been satisfying. It is further difficult to achieve an even distribution of the added calcium dioxide during carbonation, which results in an uneven reaction and quality defects in the end product. Another problem related to this process is that the MFC tend to form flocs due to its high viscosity.

Therefore, there remains a need for method to form a composite comprising MFC and PCC, which method eliminates the aforementioned problems.

SUMMARY OF THE INVENTION

One object of the present invention is to provide an improved method to produce a composite comprising MFC and PCC, which composite shows improved opacity and strength properties as compared to prior art methods.

This object is wholly or partially achieved by a method according to the independent claims. Embodiments are set forth in the appended dependent claims and in the following description.

According to a first aspect, the invention provides a method for the production of a composite comprising microfibrillated cellulose (MFC) and precipitated calcium carbonate, the method comprising the following steps:

providing a suspension comprising calcium hydroxide,
performing carbonation of said calcium hydroxide to form precipitated calcium carbonate, wherein MFC is added to said suspension during said carbonation of calcium hydroxide whereby calcium carbonate is at least partly precipitated onto fibers or fibrils of the MFC.

In the context of the invention, the term "during" means that the MFC is added to the suspension after carbonation of some of the calcium hydroxide, but before carbonation of all of the calcium hydroxide present in the suspension. In accordance with the invention, the total amount of MFC added to the process is added during carbonation of the calcium hydroxide.

By adding microfibrillated cellulose to the calcium suspension during the carbonation, the brightness and the strength of the MFC/PCC-composite is enhanced as compared to the case when the MFC is added to the PCC reactor before the carbonation begins. Moreover, the inventive method facilitates the distribution of calcium dioxide and MFC in the suspension and thus gives rise to a more homogenous product.

MFC is preferably added to the suspension at a time when between 50% and 95%, even more preferably at a time when between 70-95% or 75-95%, of the calcium hydroxide has been reacted with carbon dioxide to form calcium carbonate. It has been shown that the addition of the MFC at this point of the reaction gives a composite with optimized properties.

In one preferred embodiment of the invention, a mixture of MFC and calcium carbonate is added to the suspension during said carbonation of calcium hydroxide. Said mixture may be provided by mixing pre-made MFC and calcium carbonate, or a mixture achieved by fibrillating cellulose into MFC in the presence of calcium carbonate. In this way, the bonding ability of the composite hereby produced is enhanced even further. Thus, the composite provides both a high bonding ability and a high bulk in the end-product.

In a second aspect, the invention discloses a composite produced according to the above disclosed method. The composite produced shows improved brightness, opacity and strength properties.

In a third aspect, the invention discloses use of said composite in paper or paperboard production. The composite produced in this way allows for an increased amount of fillers added to a board or paper without reduction of strength or stiffness of the product. It further enhances the birghness and the opacity of the thus produced paper or paperboard.

The invention further discloses a method of producing paper or paperboard comprising the steps of:
providing a fiber-containing furnish,
adding the composite disclosed above to said furnish, and
forming and dewatering the fiber-containing furnish.

The invention further discloses a paper or paperboard comprising the composite. Said paper may be fine paper, wherein the total filler content of the paper is 25-35 wt %, based on the total solid content of said paper. The paper may be newsprint paper with a total filler content from 10-15 wt %, based on the total solid content of said paper. In yet another embodiment, the paper is super calendered (SC) paper and the total filler content of the paper is at least 39 wt %, preferably between 39-45 wt % by weight, based on the total solid content of said paper.

DETAILED DESCRIPTION

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., Cellulose fibres, nanofibrils and microfibrils, The morphological sequence of MFC components from a plant physiology and fibre technology point of view, Nanoscale research letters 2011, 6:417), while it is common that the aggregated form of the elementary fibrils, also defined as microfibril (Fengel, D., Ultrastructural behavior of cell wall polysaccharides, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 m$^2$/g, such as from 1 to 200 m$^2$/g or more preferably 50-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions The process according to the invention involves addition of MFC during carbonation of a calcium hydroxide to form percipitated calcium carbonate. to the process of carbonating "Carbonation" (also sometimes referred to as "Carbonatation") refers to the chemical reaction in which calcium hydroxide reacts with carbon dioxide and forms insoluble calcium carbonate. The carbonation of said calcium hydroxide is preferably performed by the addition of carbon dioxide to the suspension, e.g. by bubbling a gas stream comprising carbon dioxide into the suspension for a certain time, whereby the calcium hydroxide is reacted with the carbon dioxide and calcium carbonate is precipitated. The MFC is added to the suspension after the addition of carbon dioxide has started, but before the addition of the carbon dioxide is completed, i.e. during the addition of carbon dioxide. The step of carbonating, and how much of the carbon hydroxide that has been reacted, may be measured by measuring the conductivity or the pH of the suspension during the addition of carbon dioxide. Preferably, starch and/or CMC is added to the suspension when between 50% and 95%, or more preferably when between 75-95%, or even more preferably 85-95% of the total amount calcium hydroxide present in the suspension has been reacted with carbon dioxide and formed calcium carbonate.

The suspension of calcium hydroxide is carbonated over a total reaction time to form an aqueous suspension of precipitated calcium carbonate. The MFC is preferably added during the reaction time period after 25 percent of the total reaction time Rt is elapsed. Preferably, the MFC is added during the reaction time period after at least 50% of the total reaction time, more preferably at reaction point in time between 50%-95%, 70%-95% or 75%-95% of the total reaction time.

The method of the invention may take place in a batch or continuous process wherein a gas stream containing carbon dixoide at, e.g. 10-20 wt % by volume, may bubbled into a reactor at a rate of e.g. 1 l carbon dixoide per minute, preferably at atmospheric pressure. The reaction temperature during carbonation is perferably between 50-100° C., around 65° C. Preferably, MFC is added to the suspnesion during said carbonation in an amount such that the ratio between said MFC and the precipitated calcium carbonate formed (MFC/PCC) is within between 2/100 to 20/100. The MFC should preferably have an SR value >70, more preferably >80. SR denotes the Schopper Riegler number which can be achieved as well as determined using methods known in the art.

In one embodiment of the invention, a mixture of MFC and calcium carbonate, e.g. a mixture produced according to WO 2010/112519 A1, is added to the suspension during the carbonation of calcium hydroxide.

The end uses for a composite formed through the inventive method may be in paper, paperboard or other applications such as plastics, food, medicine tooth paste, paints etc.

In paper or paperboard production, the composite may be used as filler material by adding the composite to a pulp furnish comprising cellulosic fibers of hardwood and/or softwood. Said furnish may be applied onto a wire and further dewatered and dried in accordance with conventional papermaking technology. The composite may also be used in surface treating compositions of paper or paperboard, e.g. in surface sizing or coating of the paper or paperboard.

The composite in accordance with the invention enables a higher amount of filler to be added to the paper or paperboard without substantially decreasing the bulk or strength properties of the paper or paperboard. Moreover, the composite in accordance with the invention significantly improves the brightness of the thus formed paper or paperboard.

EXAMPLE

Figure 1:
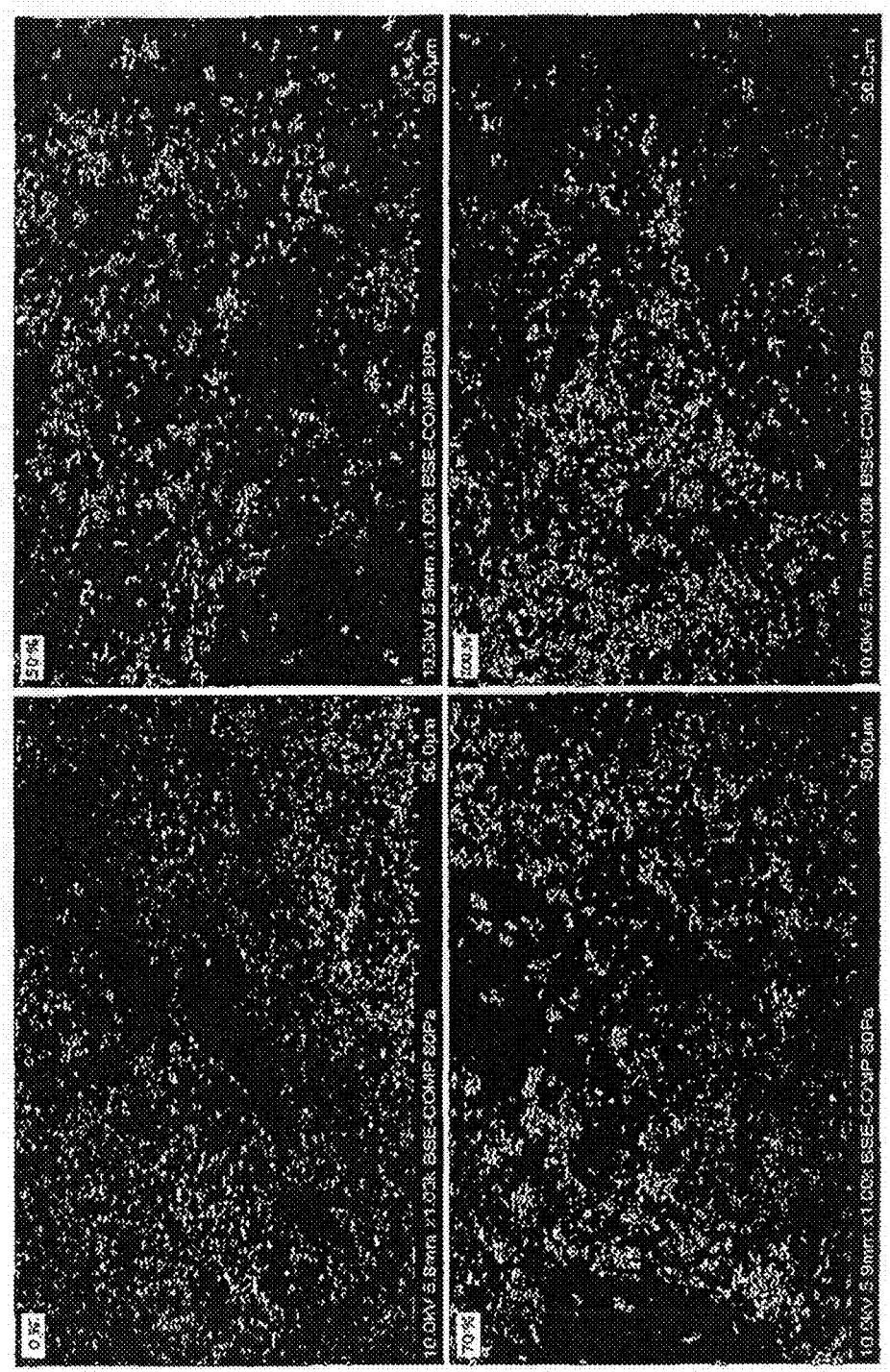
FIG. 1 shows the SEM images of unwashed samples C REF (0%, upper left), C50 (50%, upper right), C70 (70%, lower left) and REF ALL (lower right), all with 1000 magnitude.

In order to evaluate the method and the composite of the invention, a test series was performed in which SEM images of samples made according to the invention (samples C50 and C70) were analyzed and compared to SEM images of samples made by addition of MFC before (C REF) and after (REF ALL) complete precipitation of PCC.

Addition of microfibrillated cellulose (MFC) before, during and after PCC precipitation ($Ca(OH)_2 + CO_2 \rightarrow CaCO_3$) were tested using batch precipitation and by adding MFC to the reactor at different points in time. The specific point in time of addition was established by deremining the total reaction time by precipitating PCC at the same conditions (without fiber addition) and thereafter calculate the desired point in time of addition as a percentage of the total reaction time. The endpoint of the reaction was determined by pH measurement (sharp decrease in pH value).

Four samples (Series "C") were made using different point in times of addition, wherein MFC was added at a point in time when a pre-decided percentatge of the total reaction time had passed (table 1)

TABLE 1

| Sample | Point of MFC addition |
| --- | --- |
| C REF | As a pre-addition to the milk of lime ($Ca(OH)_2$), before carbonation was started (at 0% of the total reaction time) |
| C50 | At 50% of the total reaction time |
| C70 | At 70% of the total reaction time |
| REF ALL | As a post addition to the readymade PCC (at 100% of the total reaction time) |

Scheme of experiment was as follows:
1) 14.8 g laboratory made $Ca(OH)_2$ as lime milk was diluted into tap water to form 900 g batch (resulting ca. 1.6% $Ca(OH)_2$)
   $Ca(OH)_2$ solids dictated by the fiber concentration desired (linked via targeted ash content)
2) Lime milk batch was heated to 70-80° C. temperature
   Morphology control
3) $CO_2$ (g) feed and timing of reaction was started
   Low stirring rate (500 rpm) to avoid air intake from vortex
4) At the chosen time of addition, 20 g of MFC was added as wet (1.46%), resulting fiber consistency of ca. 0.9% in the batch. Heating was switched off and temperature was allowed to change freely
   Stirring rate increased to 1600 rpm to mix properly
   Low fiber consistency used to allow more exact dosing
5) $CO_2$ (g) feed was continued until a sharp drop in pH value was determined, after which $CO_2$ feed was stopped and the reactor vessel emptied
6) All the samples were washed in the same way: pulp sample with 0.5 g solids was diluted to 500 ml (1 g/l). The samples was washed using 1 liter of water (i.e. 2 l/g of sample). The washing was done under normal pressure with stirring (stirred cell). Filter media was metal wire with 25 μm openings. After washing, 15 ml of the sample was taken for freeze drying. The rest of the sample was centrifuged (to increase sample concentration) and dried in oven (105° C.). Ash content was measured at 525+25° C. according to TAPPI standard T 211 om-02.

TABLE 2

| Sample | Fiber consist. [%] | Measured ash, before washing [%] | Measured ash, after washing [%] | Conditions before reaction | | Conditions after reaction | |
| --- | --- | --- | --- | --- | --- | --- | --- |
| | | | | pH | T [° C.] | pH | T [° C.] |
| C REF | 0.9 | 47.3 | 36.1 | 11.1 | 48.9 | 6.9 | 55.0 |
| C 50 | 0.9 | 47.1 | 29.6 | 10.6 | 73.9 | 6.2 | 48.8 |

TABLE 2-continued

| Sample | Fiber consist. [%] | Measured ash, before washing [%] | Measured ash, after washing [%] | Conditions before reaction pH | Conditions before reaction T [° C.] | Conditions after reaction pH | Conditions after reaction T [° C.] |
|---|---|---|---|---|---|---|---|
| C 70 | 0.9 | 46.8 | 25.6 | 10.7 | 72.4 | 6.4 | 51.1 |
| REF ALL | 0.9 | 46.8 | 21.9 | 10.4 | 71.6 | | |

CO2 used was >95% pure and all samples were made under atmospheric pressure. Targeted PCC ash content before the washing step was 50%.

TABLE 3

| Sample | PCC (g) in 1 g sample, unwashed | PCC (g) in 1 g sample, washed | PCC loss (g) | PCC loss (%) |
|---|---|---|---|---|
| CREF | 0.898 | 0.565 | 0.333 | 37.1 |
| C50 | 0.890 | 0.420 | 0.470 | 52.8 |
| C70 | 0.880 | 0.344 | 0.536 | 60.9 |
| REF ALL | 0.880 | 0.280 | 0.599 | 68.1 |

As can be seen in the SEM image of C REF (FIG. 1 and FIG. 2, upper left), the fibers are evenly covered with small fine PCC particles when the MFC is added prior to carbonation. The particles are bonded to the fibers also after washing (cf. FIG. 1 and FIG. 2, upper left). This gives rise to a weak bonding ability of the MFC, since PCC interfere between MFC/MFC bonds.

Figure 2:
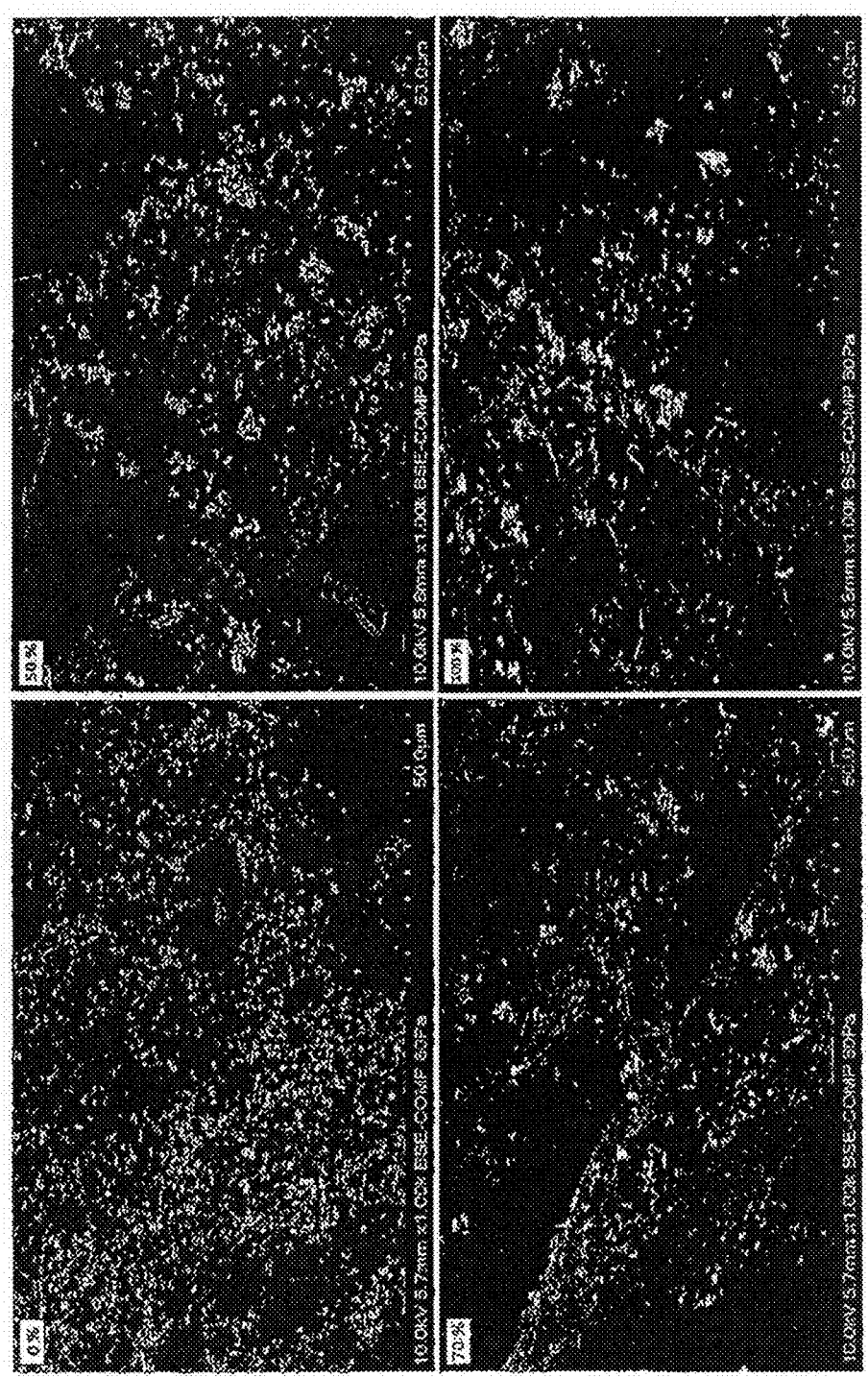
FIG. 2 shows the SEM images of washed samples C REF (0%, upper left), C50 (50%, upper right), C70 (70%, lower left) and REF ALL (lower right), all with 1000 magnitude.

The addition of MFC to the PCC after carbonation is completed (REF ALL) results in larger PCC particles which are not bound to the fibers (cf. FIG. 1 and FIG. 2, lower right). After washing, the loose PCC particles are removed, showing that only a few PCC particles are bound to the fiber surface (FIG. 2, lower right).

The SEM images of the composites made according to the invention (FIG. 1 and FIG. 2, upper right 50%, and lower left 70%) shows distinct PCC particles bonded to the fibers in a controlled manner, without completely covering the surface of the fibers, which improves the bonding potential and the brightness of the end product.

Table 3 shows the PCC loss during washing of the samples, which indicates how much of the PCC that was loose and not attached to the fibers in respective sample. As can be seen in table 3, the PCC loss is highest for the REF ALL sample (when the MFC was mixed with readymade PCC), while it is lowest for the C REF (when the MFC was added prior to carbonation).

Thus, the result shows that the coverage and morphology of the PCC on the microfibers can be controlled and optimized by the inventive concept.

The invention claimed is:

1. A method of producing a composite, said method comprising the steps of;
    providing a suspension comprising calcium hydroxide, and,
    performing carbonation of said calcium hydroxide to form precipitated calcium carbonate (PCC),
    wherein microfibrillated cellulose (MFC) is added to said suspension during said carbonation of calcium hydroxide at a time when at least 25%, but less than all, of the calcium hydroxide has been reacted with carbon dioxide to form calcium carbonate onto fibers or fibrils of the MFC.

2. A method of producing a composite according to claim 1, wherein the carbonation of said calcium hydroxide is performed by the addition of carbon dioxide to the suspension.

3. A method of producing a composite according to claim 1, wherein MFC is added to the suspension at a time when between 50% and 95% of the calcium hydroxide has been reacted with carbon dioxide to form calcium carbonate.

4. A method of producing a composite according to claim 1, wherein said MFC is added to the suspension at a time when between 75-95% of the calcium hydroxide has been reacted with carbon dioxide to form calcium carbonate.

5. A method of producing a composite according to claim 1, wherein a mixture of MFC and calcium carbonate is added to said suspension during said carbonation of calcium hydroxide.

6. A composite produced by the method according to claim 1.

7. A method of producing paper or paperboard comprising the steps of;
    providing a fiber-containing furnish;
    adding the composite according to claim 6 to said furnish;
    forming and dewatering the fiber-containing furnish.

8. A paper or paperboard comprising the composite according to claim 6.

9. The paper according to claim 8, wherein the paper is fine paper and a total filler content of the paper is from 25-35 wt % based on a total solid content of said paper.

10. The paper according to claim 8, wherein the paper is newsprint paper and a total filler content of the paper is from 10-15 wt % based on a total solid content of said paper.

11. The paper according to claim 8, wherein the paper is supercalendered (SC) paper and a total filler content of the paper is at least 39 wt % based on a total solid content of said paper.

12. The paper according to claim 8, wherein the paper is supercalendered (SC) paper and a total filler content of the paper is between 39-45 wt % based on a total solid content of said paper.

* * * * *